(12) United States Patent
Lee et al.

(10) Patent No.: US 9,705,994 B2
(45) Date of Patent: Jul. 11, 2017

(54) APPARATUS AND METHOD FOR REAL-TIME RECOMMENDATION OF MULTIMEDIA CONTENT IN COMMUNICATION SYSTEM

(71) Applicant: Samsung Electronics Co., Ltd., Gyeonggi-do (KR)

(72) Inventors: Kyung-Tak Lee, Gyeonggi-do (KR); Gyu-Bong Oh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 170 days.

(21) Appl. No.: 14/488,890

(22) Filed: Sep. 17, 2014

(65) Prior Publication Data
US 2015/0081775 A1 Mar. 19, 2015

(30) Foreign Application Priority Data

Sep. 17, 2013 (KR) .......................... 10-2013-0112178

(51) Int. Cl.
*G06F 15/16* (2006.01)
*H04L 29/08* (2006.01)
(Continued)

(52) U.S. Cl.
CPC ...... *H04L 67/141* (2013.01); *G06F 17/30017* (2013.01); *H04L 29/08072* (2013.01);
(Continued)

(58) Field of Classification Search
CPC .......................... H04L 29/08072; H04L 29/06
(Continued)

(56) References Cited

U.S. PATENT DOCUMENTS 6,799,184 B2 * 9/2004 Bhatt ................ G06F 17/30569
707/718
7,091,959 B1 * 8/2006 Clary .................. G06F 3/03545
345/173
(Continued)

FOREIGN PATENT DOCUMENTS

EP   2 381 641     10/2011
EP   2 547 065     1/2013
WO   WO 2013/089430  6/2013

OTHER PUBLICATIONS

E. Campbell et al: "The Message Session Relay Protocol (MSRP); rfc4975.txt", Network Working Group, Sep. 1, 2007.
(Continued)

*Primary Examiner* — Khanh Dinh
(74) *Attorney, Agent, or Firm* — The Farrell Law Firm, P.C.

(57) ABSTRACT

A method and apparatus for recommending multimedia content in a communication system are provided. The method includes generating recommendation information for recommending content, and transmitting a message including the recommendation information, wherein the recommendation information includes information necessary for joining a session carrying the recommended content. The apparatus includes a control unit configured to generate recommendation information for recommending content; and a communication unit configured to transmit a message including the recommendation information, wherein the recommendation information includes information for joining a session carrying the content.

24 Claims, 12 Drawing Sheets

(51) Int. Cl.
  *H04L 29/06* (2006.01)
  *H04N 21/472* (2011.01)
  *H04N 21/4788* (2011.01)
  *H04N 21/482* (2011.01)
  *H04N 21/658* (2011.01)
  *G06F 17/30* (2006.01)

(52) U.S. Cl.
  CPC ...... H04L 65/1006 (2013.01); H04L 65/4076 (2013.01); H04L 67/42 (2013.01); H04N 21/4788 (2013.01); H04N 21/47202 (2013.01); H04N 21/4826 (2013.01); H04N 21/6581 (2013.01)

(58) Field of Classification Search
  USPC .......................... 709/206, 220, 227; 370/352
  See application file for complete search history.

(56) References Cited

U.S. PATENT DOCUMENTS

| | | | | |
|---|---|---|---|---|
| 8,351,424 B2* | 1/2013 | Jin | ........................ | H04L 61/106 370/352 |
| 8,411,673 B2* | 4/2013 | Jin | ........................ | H04L 61/106 370/352 |
| 2006/0041431 A1* | 2/2006 | Maes | ...................... | G10L 15/30 704/270.1 |
| 2006/0248160 A1* | 11/2006 | Plummer | .......... | G06F 17/30899 709/217 |
| 2011/0026518 A1* | 2/2011 | Jin | ........................ | H04L 61/106 370/352 |
| 2011/0138064 A1* | 6/2011 | Rieger | .............. | G06F 17/30905 709/228 |
| 2011/0200035 A1* | 8/2011 | Sunstrum | ............ | H04M 1/2471 370/352 |
| 2011/0300834 A1 | 12/2011 | Ni et al. | | |
| 2012/0259950 A1* | 10/2012 | Havekes | .............. | H04L 65/4084 709/217 |
| 2012/0290953 A1 | 11/2012 | Russell et al. | | |
| 2013/0081084 A1* | 3/2013 | Scheer | ............... | H04N 21/2408 725/46 |
| 2013/0124652 A1* | 5/2013 | Kim | ........................ | H04L 51/32 709/206 |
| 2014/0365484 A1* | 12/2014 | Freeman | ................ | G06Q 50/01 707/736 |

OTHER PUBLICATIONS

European Search Report dated Dec. 22, 2014 issued in counterpart application No. 14185193.1-1908.

European Search Report dated May 24, 2016 issued in counterpart application No. 14185193.1-1908, 8 pages.

Summons to Attend Oral Proceedings dated Feb. 1, 2017 issued in counterpart application No. 14185193.1-1908, 10 pages.

* cited by examiner

APPARATUS AND METHOD FOR REAL-TIME RECOMMENDATION OF MULTIMEDIA CONTENT IN COMMUNICATION SYSTEM

PRIORITY

This application claims priority under 35 U.S.C. §119(a) to a Korean Patent Application filed on Sep. 17, 2013 in the Korean Intellectual Property Office and assigned Serial No. 10-2013-0112178, the contents of which are incorporated herein by reference.

BACKGROUND

1. Field of the Invention

The present invention relates generally to providing multimedia content in a communication system, and more particularly, to an apparatus and method for concurrent viewing of multimedia content among a plurality of users in a communication system.

2. Description of the Related Art

With the growth of communication technologies, a service of providing multimedia content through a communication network was made possible. The multimedia content can be provided in non-real-time or real-time and, further, can be provided in a wireless network as well as a wired network.

A quality of a multimedia service through a communication network can be evaluated in various aspects. In the aspect of a communication technology, due to the recent introduction of richer contents (for example, 3-Dimension (3D) content, multi-view content, and a 7.1 channel system), there is a need for a data transfer rate capable of supporting a higher transfer rate. Also, in the aspect of a user's consumption inclination, there is a need to define a procedure and protocol suitable to each service so as to support services of various forms. Accordingly, active research in each field is being conducted.

SUMMARY

The present invention has been made to address at least the above-mentioned problems and/or disadvantages, and to provide at least the advantages below. Accordingly, an aspect of the present invention is to provide an apparatus and method for providing multimedia content in a communication system.

Another aspect of the present invention is to provide an apparatus and method for concurrent viewing of multimedia content among a plurality of users in a communication system.

A further aspect of the present invention is to provide an apparatus and method for recommending multimedia content to another user in a communication system.

Yet another aspect of the present invention is to provide an apparatus and method for another user's joining a session providing multimedia content in a communication system.

Still another aspect of the present invention is to provide an apparatus and method for providing information required for another user to join a session providing multimedia content in a communication system.

In accordance with an aspect of the present invention, a method of a user device recommending multimedia content in a communication system is provided. The method includes generating recommendation information for recommending content; and transmitting a message comprising the recommendation information, wherein the recommendation information comprises information for joining a session carrying the recommended content.

In accordance with another aspect of the present invention, a method of a user device recommending multimedia content in a communication system is provided. The method includes receiving a first message comprising recommendation information for recommending content; and transmitting a second message for another user device having transmitted the first message to join a session carrying the content using the recommendation information, wherein the recommendation information comprises information for joining the session carrying the contents.

In accordance with another aspect of the present invention, a method of a server recommending multimedia content in a communication system is provided. The method includes generating recommendation information for recommending content; and transmitting a message comprising the recommendation information, wherein the recommendation information comprises information for joining a session carrying the content.

In accordance with another aspect of the present invention, a user device in a communication system is provided. The user device includes a control unit configured to generate recommendation information for recommending content; and a communication unit configured to transmit a message comprising the recommendation information, wherein the recommendation information comprises information for joining a session carrying the content.

In accordance with another aspect of the present invention, a user device in a communication system is provided. The user device includes a communication unit configured to receive a first message comprising recommendation information for recommending content, and transmit a second message for another user device having transmitted the first message to join a session carrying the contents using the recommendation information, wherein the recommendation information comprises information for joining the session carrying the content.

In accordance with another aspect of the present invention, a server device in a communication system is provided. The server device includes a control unit configured to generate recommendation information for recommending content; and a communication unit configured to transmit a message comprising the recommendation information, wherein the recommendation information comprises information for joining a session carrying the content.

BRIEF DESCRIPTION OF THE DRAWINGS

The above and other aspects, features and advantages of the present invention will become more apparent from the following detailed description, when taken in conjunction with the accompanying drawings in which.

DETAILED DESCRIPTION OF EMBODIMENTS OF THE PRESENT INVENTION

Embodiments of the present invention are described below with reference to the accompanying drawings. In describing the present invention, well-known functions or constructions are not described in detail since they would unnecessarily obscure the invention. And, terms described below, which are defined considering functions in the present invention, can be modified in accordance to user and operator intention or practice. Therefore, a term should be defined on the basis of the content throughout the present specification.

Below, the present invention describes a technology of providing multimedia content in a communication system. That is, the present invention is related to multimedia consumption (for example, broadcast viewing), and interaction among related users. Particularly, the present invention describes a technology of recommending specific multimedia content which is being viewed, among users.

In the present invention, the user device may be a portable electronic device, and may be one of a personal computer, a laptop computer, a smart phone, a portable terminal, a mobile phone, a mobile pad, a media player, a tablet computer, a handheld computer or a Personal Digital Assistant (PDA). Also the user device may be a device combining two or more functions among the aforementioned devices.

As various and rich contents are provided via a multimedia service, a content use form is envisioned in which a user alone not only consumes content, but also consumes the content together with other users or a content service provider via real-time social interaction. For example, even diverse scenarios such as viewing the same content with a remote user, chatting about content, or relaying to a service provider a common answer to a quiz provided in content are envisioned.

To achieve real-time social interaction among users, the users should be provided with the same content at the same time. However, it is not easy for even users (for example, friends, a family) who know each other to view specific content at the same time. Accordingly, there is a need for a technology in which the users can easily concurrently consume content, where the content and time are not previously defined among the users.

Figure 1:
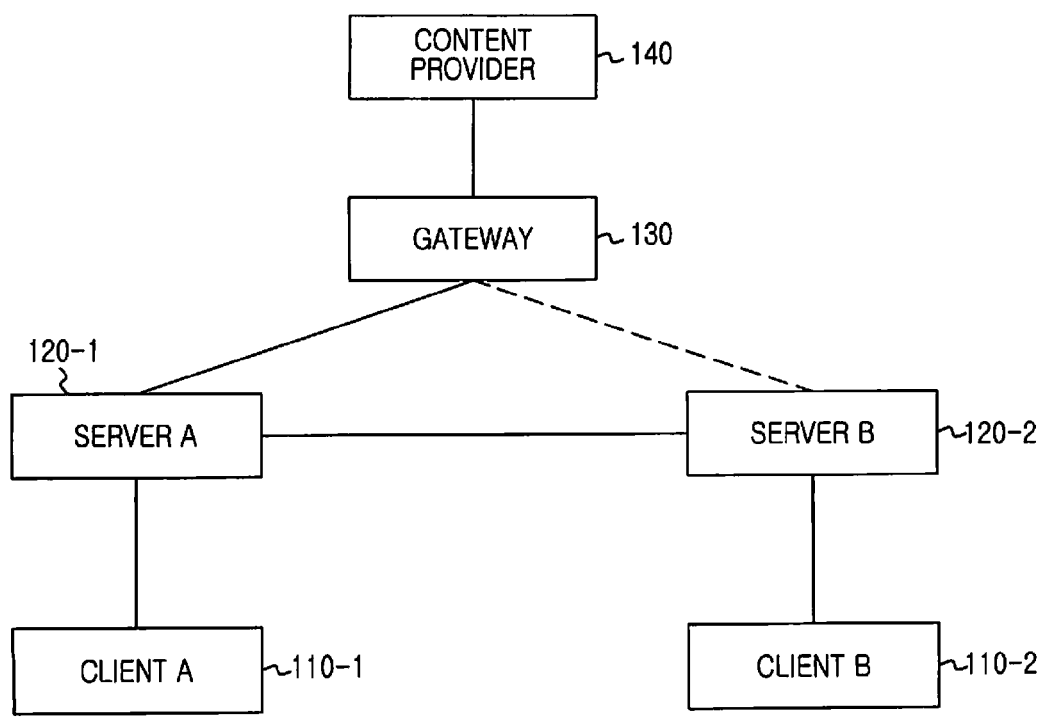
FIG. 1 is a block diagram illustrating a multimedia service in a communication system according to an embodiment of the present invention.

FIG. 1 is a block diagram illustrating a multimedia service in a communication system according to an embodiment of the present invention.

Referring to FIG. 1, a network includes a client A 110-1, a client B 110-2, a server A 120-1, a server B 120-2, a gateway 130, and a content provider 140.

The client A 110-1 and the client B 110-2, which are user devices, output received contents via output means. The client A 110-1 and the client B 110-2 are denoted as "Immersive Social Center (ISC) clients." The server A 120-1 and the server B 120-2 perform processing corresponding to a request of the client A 110-1 or the client B 110-2, and provide the content of the content provider 140 to the client A 110-1 or the client B 120-2. The server A 120-1 and the server B 120-2 are denoted as "ISC servers."

The gateway 130 enables content transmission/reception between server A 120-1, server B 120-2, and the content provider 140. For instance, when different protocols between server A 120-1, server B 120-2, and the content provider 140 are used, the gateway 130 performs mutual protocol conversion. The content provider 140 holds content and distributes the content in accordance to a request. The server A 120-1 and the server B 120-2 may be connected to the same service provider, for instance, the content provider 140, via the gateway 130.

Figure 2:
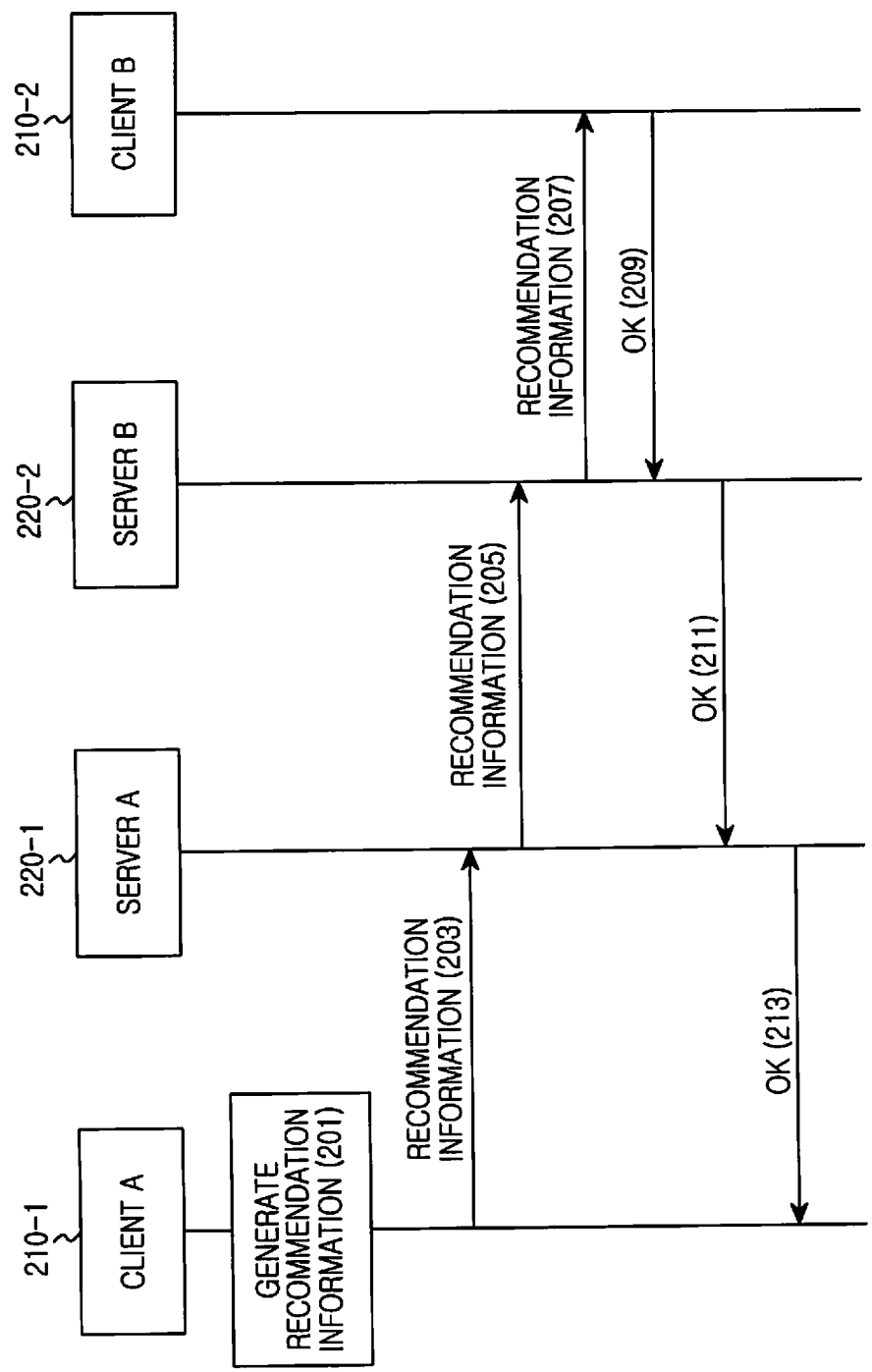
FIG. 2 is a ladder diagram illustrating a signal exchange for recommendation of multimedia content in a communication system according to an embodiment of the present invention.

FIG. 2 is a ladder diagram illustrating a signal exchange for recommendation of multimedia content in a communication system according to an embodiment of the present invention.

Referring to FIG. 2, in step 201, a client A 210-1 generates recommendation information for a client B 210-2. In step 203, the client A 210-1 transmits the recommendation information to a server A 220-1. In step 205, the server A 220-1 relays the received recommendation information to a server B 220-2. In step 207, the server B 220-2 transmits the recommendation information to the client B 210-2. In step 209, the client B 210-2 transmits a confirmation message "OK" confirming that it has received the recommendation information to the server B 220-2. In step 211, the server B 220-2 relays the confirmation message "OK" to the server A 220-1. In step 213, the server A 220-1 transmits the confirmation message "OK" to the client A 210-1.

The recommendation information generated in step 201 includes information about specific multimedia content that a user of the client A 210-1 intends to recommend to a user of the client B 210-2. In an embodiment of the present invention, the recommendation information may be defined variously. In an embodiment of the present invention, the recommendation information includes at least one of a name of a program intended to be recommended, identification information capable of identifying the program, a program description, program start time information, program end time information, and a method of acquiring more detailed information about the program. For example, the recommendation information may be constructed in an eXtensible Markup Language (XML) form as in Table 1 below.

TABLE 1

```
Content-Type: text/xml
Content-Length: [length of recommendation info]
<recommend_info>
    <name> ... </name>
    <id> ... </id>
    <description> ... </description>
    <start_time> ... </start_time>
    <end_time> ... </end_time>
    <info_url> ... </info_url>
    <user_message> ... </user_message>
    <expiry_time> ... </expiry_time>
</recommend_info>
```

In Table 1 above, the "<name> . . . </name>" represents a name of a program intended to be recommended, the "<id> . . . </id>" represents identification information capable of identifying the program, the "<description> . . . </description>" represents a program description (for example, a program genre, a main player and the like), the "<start_time> . . . </start_time>" represents program start time information, the "<end_time> . . . </end_time>" represents program end time information, the "<info_url> . . . </info_url>" represents a webpage providing more detailed information about the program, the "<user_message> . . . </user_message>" represents a message of a recommender transmitted to a recommendee, and the "<expiry_time> . . . </expiry_time>" represents available period information of recommendation information.

In an embodiment of the present invention, the recommendation information includes a preview image of a recommended program. In this case, for example, after the client A 210-1 captures a screen of a program which is being viewed at a time a user provides a recommendation, the client A 210-1 may transmit a captured image as the preview image. For another example, the client A 210-1 may transmit as the preview image an image previously defined for the recommended program.

In an embodiment of the present invention, the recommendation information includes a personal message transmitted by a recommender. In an embodiment of the present invention, the recommendation information includes an available period of the recommendation information. In this case, for example, where a user of the client A 210-1 intends to recommend only a specific section (for example, a section in which a specific person appears) among a recommended program, the available period is up to a time point when the user is no longer able to view a specific entertainer in the program. At this time, the available period is earlier than a program end time. Though the recommendation information includes the personal message and the available period, the personal message and the available period may be defined as optional items. In this case, the user of the client A 210-1 should not necessarily set the personal message and the available period.

Figure 3:
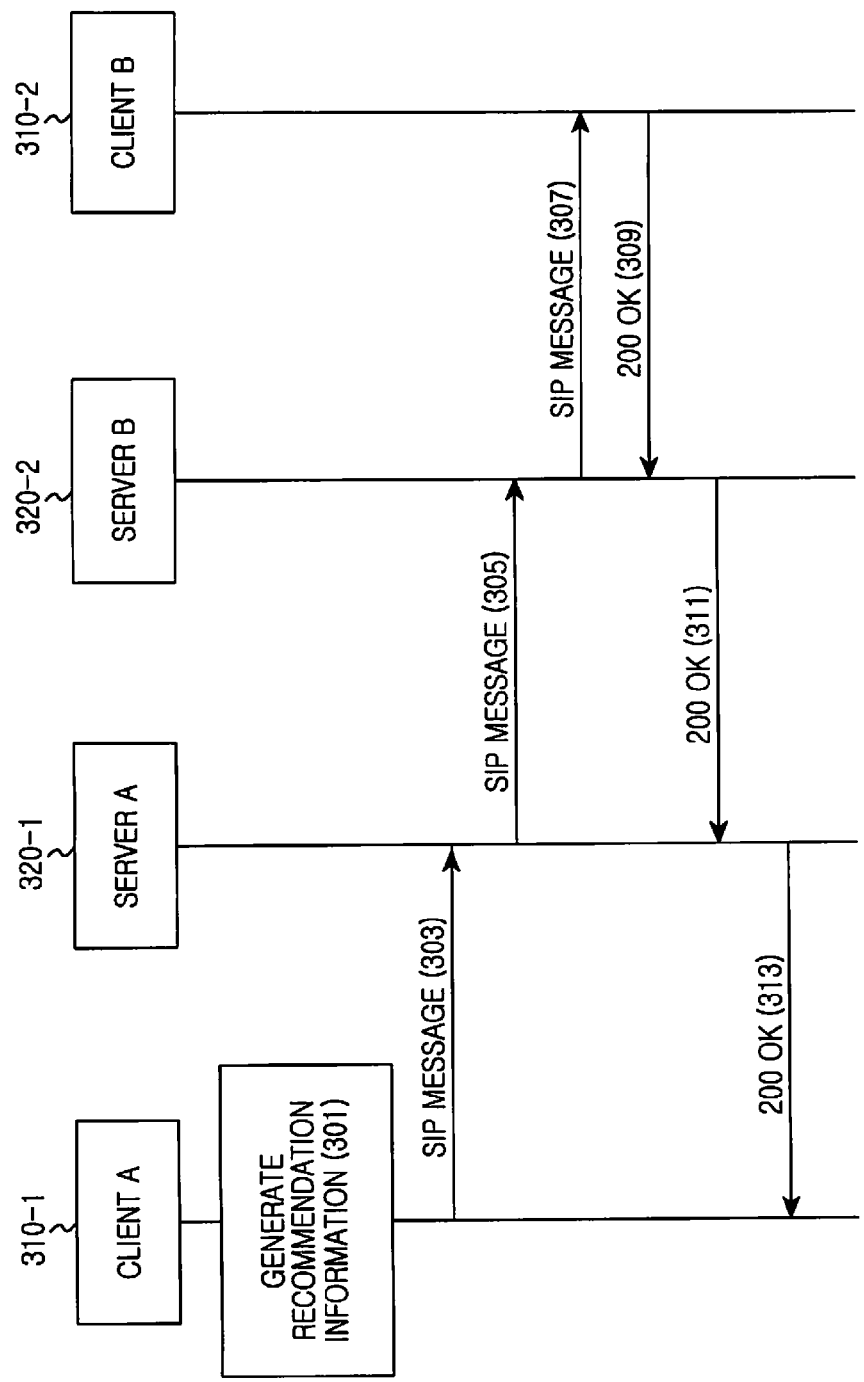
FIG. 3 is a ladder diagram illustrating a signal exchange for recommendation of multimedia content in a communication system according to another embodiment of the present invention.

FIG. 3 is a ladder diagram illustrating a signal exchange for recommendation of multimedia content in a communication system according to an embodiment of the present invention. FIG. 3 illustrates an exemplary embodiment using a Session Initiation Protocol (SIP).

Referring to FIG. 3, in step 301, a client A 310-1 generates recommendation information for a client B 310-2. In step 303, the client A 310-1 transmits a SIP message including the recommendation information to a server A 320-1. In step 305, the server A 320-1 transmits the received recommendation information to a server B 320-2. That is, the server A 320-1 relays the SIP message including the recommendation information to the server B 320-2. In step 307, the server B 320-2 transmits the SIP message including the recommendation information to the client B 310-2. In step 309, the client B 310-2 transmits a "200 OK" message confirming that it has received the recommendation information to the server B 320-2. In step 311, the server B 320-2 relays the "200 OK" message to the server A 320-1. In step 313, the server A 320-1 transmits the "200 OK" message to the client A 310-1.

The SIP message transmitted in step 303 to step 307 may include information such as in Table 2 below.

TABLE 2

```
MESSAGE sip:userB@domainB.com SIP/2.0
Via: SIP/2.0/TCP clientA.domainA.com;branch=z9hG4bK776sgdkse
Max-Forwards: 70
From: sip:userA@domainA.com;tag=49583
To: sip:userB@domainB.com
Call-ID: asd88asd77a@1.2.3.4
CSeq: 1 MESSAGE
Content-Type: application/vnd.oma.isc.recommendinfo
boundary="boundary71"
Content-Length: [length of recommendation info data]
Content-Disposition: attachment
--boundary71--
Content-Type: text/xml
Content-Length: [length of program info]
<program_info>
    <name> ... </name>
    <id> ... </id>
    <description> ... </description>
    <start_time> ... </start_time>
    <end_time> ... </end_time>
    <info_url> ... </info_url>
    <user_message> ... </user_message>
    <expiry_time> ... </expiry_time>
</program_info>
--boundary71--
Content-Type: image/jpeg
Content-Length: [length of preview image]
[image file]
--boundary71--
Content-Type: text/xml
Content-Length: [length of ISC group identity information]
<group_info>
    <name> ... </name>
    <description> ... </description>
    <address> sip:OMA-ISC-programX_group123@providerY.net </address>
</group_info>
--boundary71--
```

Referring to Table 2 above, a header of the SIP message includes a value indicating a content-type newly defined for recommendation information. For example, the value indicating the newly defined content-type may be defined as "application/vnd.oma.isc.recommendinfo." That is, the SIP message includes recommendation information about content, not a general text. In accordance to this, the client B 320-2 operates in accordance to an embodiment of the present invention.

Subsequently to the header, the SIP message includes the recommendation information. The recommendation information may start with "Content-Type: text/xml." The recommendation information expressed in Table 2 above is the same as that of Table 1 above. That is, the "<name> . . . </name>" represents a name of a program intended to be recommended, the "<id> . . . </id>" represents identification information capable of identifying the program, the "<description> . . . </description>" represents a program description (for example, a program genre, a main player and the like), the "<start_time> . . . </start_time>" represents program start time information, the "<end_time> . . . </end_time>" represents program end time information, the "<info_url> . . . </info_url>" represents a webpage providing more detailed information about the program, the "<user_message> . . . </user_message>" represents a message of a recommender transmitted to a recommendee, and the "<expiry_time> . . . </expiry_time>" represents available period information of recommendation information.

Subsequently to the recommendation information, the SIP message may further include a preview image of a recommended program. Information about the preview image may start with "Content-Type: image/jpeg." In a case of Table 2 above, the preview image is expressed with "image/jpeg," but the preview image may follow formats other than the Joint Photography Experts Group (JPEG). Table 2 above exemplifies an exemplary embodiment including an image file, but the image file may be replaced with information (for example, Uniform Resource Locator (URL)) accessible to the preview image in an embodiment of the present invention.

Also, the SIP message may further include information about a group accessible in accordance to the recommendation information. The information about the group may start with "type: text/xml." The information about the group may include a group name, a description of a group, and an address for accessing the group. In Table 2 above, the "<name> . . . </name>" represents a group name, the "<description> . . . </description>" represents a description (for example, any content viewing, a topic to be discussed) of a group, and the "<address> sip:OMA-ISC-programX_group123@providerY.net </address>" represents an address for accessing the group. The address for accessing the group shown in Table 2 above exemplifies a SIP-based address. But, in an embodiment of the present invention, addresses (for example: a Telephone Uniform Resource Identifier (TEL-URI), a Hyper Text Transfer Protocol (HTTP) URL and the like) of other methods may be used.

Figure 4:
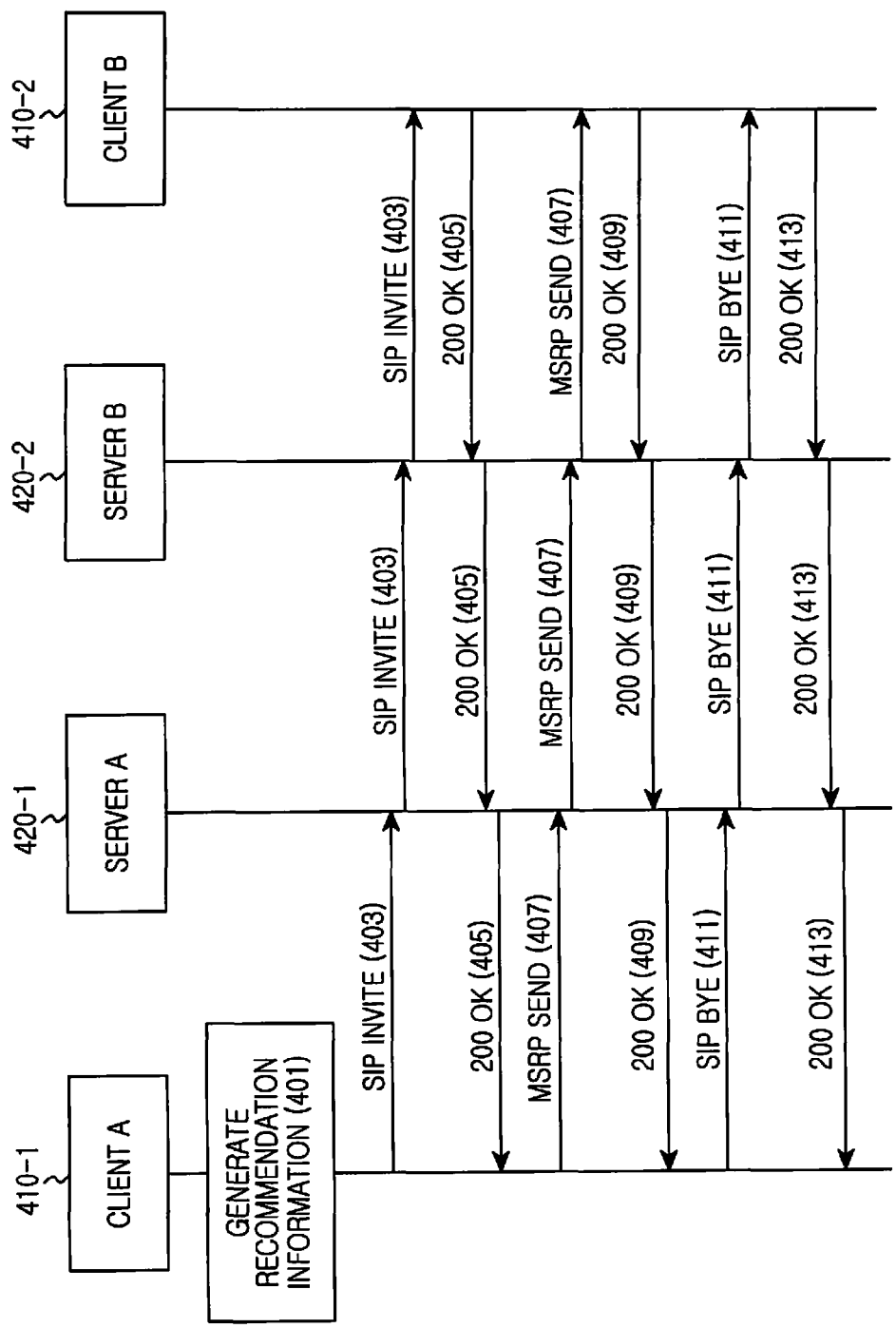
FIG. 4 is a ladder diagram illustrating a signal exchange for recommendation of multimedia content in a communication system according to an embodiment of the present invention.

FIG. 4 is a ladder diagram illustrating a signal exchange for recommendation of multimedia content in a communication system according to an embodiment of the present invention. FIG. 4 illustrates an embodiment of the present invention that using a file transfer method of a SIP.

Referring to FIG. 4, in step 401, a client A 410-1 generates recommendation information for a client B 410-2. In step 403, the client A 410-1 transmits a session setting request for transmitting the recommendation information to the client B 410-2. For example, the session setting request may be transmitted via a SIP INVITE message. The request is relayed to the client B 410-2 via a server A 420-1 and a server B 420-2.

In step 405, the client B 410-2 transmits a message of accepting the session setting request received from the client A 410-1. For example, the accepting message may be a "200 OK" message. The accepting message is relayed to the client A 410-1 via the server B 420-2 and the server A 420-1.

In step 407, the client A 410-1 transmits a relay message including the recommendation information generated in step 401. For example, the relay message may be a Message Session Relay Protocol (MSRP) message, and may be transmitted in a file transfer method. The relay message is relayed to the client B 410-2 via the server A 420-1 and the server B 420-2.

In step 409, the client B 410-2 transmits a confirmation message on the recommendation information received from the client A 410-1. For example, the confirmation message may be a "200 OK" message. The confirmation message is relayed to the client A 410-1 via the server B 420-2 and the server A 420-1.

In step 411, the client A 410-1, having transmitted the recommendation information, transmits a session end request. For example, the session end request may be transmitted via a "SIP BYE" message. The session end request is relayed to the client B 410-2 via the server A 420-1 and the server B 420-2.

In step 413, the client B 410-2 transmits a message of accepting the session end request received from the client A 410-1. For example, the accepting message may be a "200 OK" message. The accepting message is relayed to the client A 410-1 via the server B 420-2 and the server A 420-1.

The SIP INVITE message transmitted in step 403 may include information such as in Table 3 below.

TABLE 3

INVITE sip:userB@domainB.com SIP/2.0
To: <sip:userB@domainB.com>
From: <sip:userA@domainA.com>;tag=193402342
Contact: sip:userA@clientA.domainA.com
(...)
Content-Type: multipart/related; type="application/sdp"; boundary="boundary71"
Content-Length: [length]
--boundary71
   Content-Type: application/sdp
   Content-Length: [length of SDP]
v=0
o=userA 2890844526 2890844527 IN IP4 serverA.domainA.com
s=
t=0 0
m=message 7394 TCP/MSRP *
i=This is an ISC recommendation invitation
e=userA@domainA.com
a=sendonly
a=accept-types:message/cpim
a=accept-wrapped-types:*
a=file-selector:name:"Recommend_info.isc"
type:application/vnd.oma.isc.recommendinfo
  size:[size of recommend info] hash:sha-1:
  72:24:5F:E8:65:3D:DA:F3:71:36:2F:86:D4:71:91:3E:E4:A2:CE:2E
a=file-transfer-id:Q6LMoGymJdh0IKIgD6wD0jkcfgva4xvE
a=file-date:creation:"Mon, 15 May 2006 15:01:31 +0300"
a=path:msrp://serverA.domainA.com:7394/2s93i93idj;tcp
--boundary71--
Content-Type: text/plain
Content-ID: <id3@clientA.domainA.com>
Content-Length: [length of info to be transferred]
[Short info about info to be transferred, e.g. subject of the recommended content]
--boundary71--

Referring to Table 3 above, in the SIP INVITE message, a "From" header includes an address of a recommender, and a "To" header includes an address of a recommendee. For example, the SIP INVITE message includes a phrase similar to "To: <sip:userB@domainB.com> From: <sip:userA@domainA.com>;tag=193402342."

Also, to represent that it will transmit the recommendation information, the SIP INVITE message may include a Multipurpose Internet Mail Extensions (MIME) type newly defined for the recommendation information. For example, as in Table 2 above, the MIME type may be set as "application/vnd.oma.isc.recommendinfo." The newly defined MIME type indicates that the recommendation content of content, not general file transfer, will be transmitted. The newly defined MIME type is based on a Session Description Protocol (SDP), and may be relayed in a file transfer method. For example, the SIP INVITE message includes a phrase such as "a=file-selector:name: "Recommend_info.isc"type: application/vnd.oma.isc.recommendinfo."

Also, the SIP INVITE message may further include brief information (for example, a title of recommendation information) about the file transfer.

The MSRP SEND message transmitted in step 407 may include information such as Table 4 below.

TABLE 4

MSRP d93kswow SEND
   To-Path: msrp://clientB.domainB.com:8888/9di4ea;tcp
   From-Path: msrp://clientA.domainA.com:7394/2s93i93idj;tcp
   Message-ID:
12339sdqwer
   Byte-Range: 1-2048/4385
   Content-Type: message/cpim
To: <sip:userB@domainB.com>
From: <sip:userA@domainA.com>
DateTime: 2006-05-15T15:02:31-03:00
Content-Type: application/vnd.oma.isc.recommendinfo);
boundary="boundary71"
Content-Length: [length of recommendation info data]
Content-Disposition: attachment
--boundary71--
Content-Type: text/xml
Content-Length: [length of program info]
<program_info>
   <name> ... </name>
   <id> ... </id>
   <description> ...</description>
   <start_time> ... </start_time>
   <end_time> ... </end_time>
   <info_url> ... </info_url>
   <user_message> ... </user_message>
   <expiry_time> ... </expiry_time>
</program_info>
--boundary71—
Content-Type: image/jpeg
Content-Length: [length of preview image]
[image file]
--boundary71--
Content-Type: text/xml
Content-Length: [length of ISC group identity information]
<group_info>
   <name> ... </name>
   <description> ... </description>
   <address> sip:OMA-ISC-programX_group123@providerY.net </address>
</group_info>
--boundary71—

Referring to Table 4 above, the MSRP SEND message includes a value indicating a content-type newly defined for recommendation information. The value indicating the newly defined content-type may be defined as "application/vnd.oma.isc.recommendinfo." This indicates that the MSRP SEND message includes the recommendation content of content, not general file transfer.

Subsequently to the header, the MSRP SEND message includes the recommendation information. The recommendation information may start with "Content-Type: text/xml." The recommendation information expressed in Table 4 above is the same as that of Table 1 above. That is, the "<name> . . . </name>" represents a name of a program intended to be recommended, the "<id> . . . </id>" represents identification information capable of identifying the program, the "<description> . . . </description>" represents a program description (for example, a program genre, a main player and the like), the "<start_time> . . . </start_time>" represents program start time information, the "<end_time> . . . </end_time>" represents program end time information, the "<info_url> . . . </info_url>" represents a webpage providing more detailed information about the program, the "<user_message> . . . </user_message>" represents a message of a recommender transmitted to a recommendee, and the "<expiry_time> . . . </expiry_time>" represents available period information of recommendation information.

Subsequently to the recommendation information, the MSRP SEND message may further include a preview image of a recommended program. Information about the preview image may start with "Content-Type: image/jpeg." In a case of Table 4 above, the preview image is expressed with "image/jpeg," but the preview image may follow formats other than the JPEG.

Also, the MSRP SEND message may further include information about a group accessible in accordance to the recommendation information. The information about the group may start with "type: text/xml." The information about the group may include a group name, a description of a group, and an address for accessing the group. In Table 4 above, the "<name> . . . </name>" represents a group name, the "<description> . . . </description>" represents a description (for example, any content viewing, a topic to be discussed) of a group, and the "<address> sip:OMA-ISC-programX_group123@providerY.net </address>" represents an address for accessing the group. The address for accessing the group shown in Table 4 above exemplifies a SIP-based address. But, in accordance to an embodiment of the present invention, addresses (for example, a TEL-URI, a HTTP URL and the like) of other methods may be used.

Figure 5:
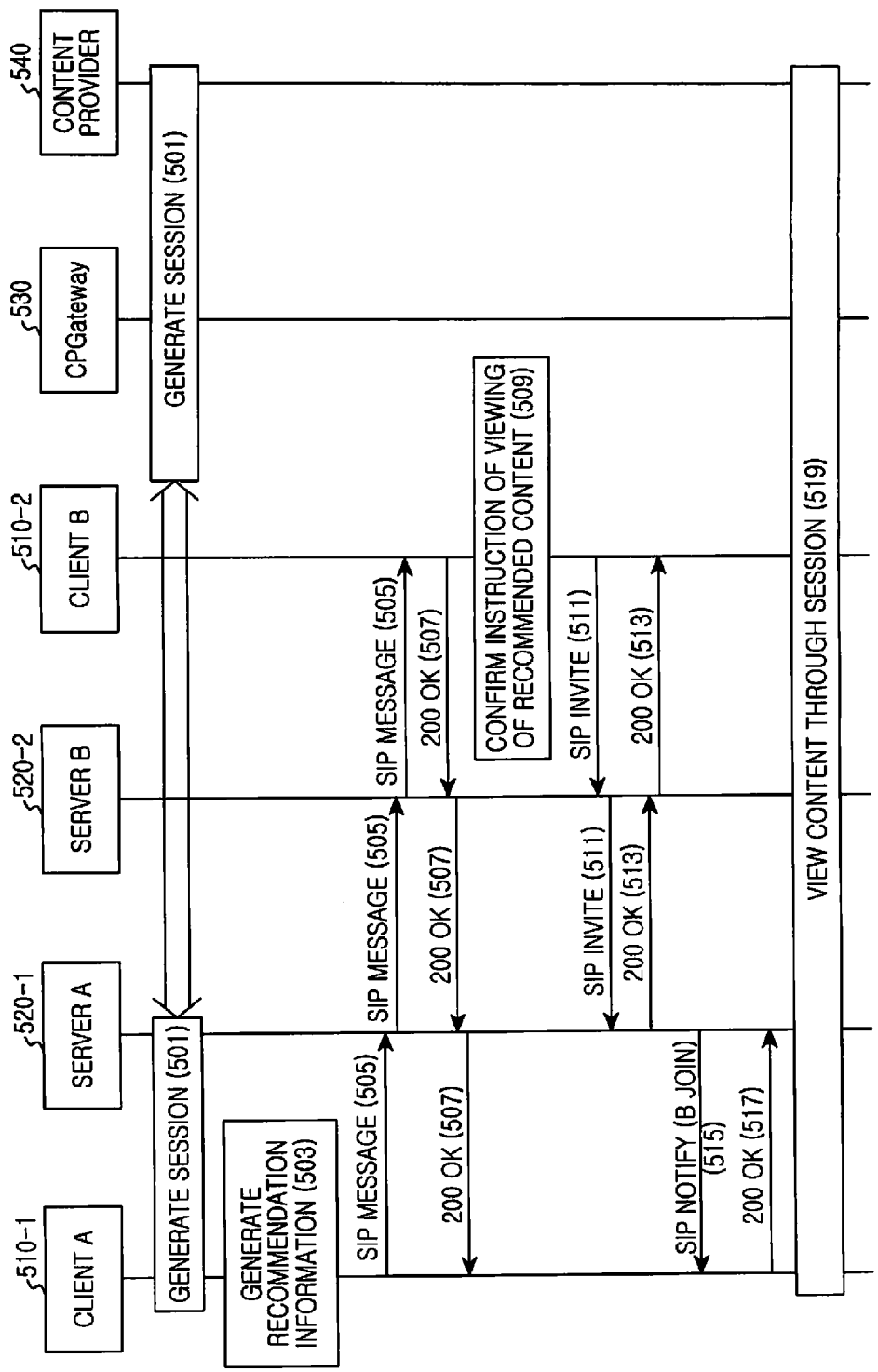
FIG. 5 is a ladder diagram illustrating a signal exchange for viewing of recommended multimedia content in a communication system according to an embodiment of the present invention.

FIG. 5 is a ladder diagram illustrating a signal exchange for viewing of recommended multimedia content in a communication system according to an embodiment of the present invention. FIG. 5 illustrates an embodiment of the present invention corresponding to a case where recommendation information is relayed in accordance to an embodiment illustrated in FIG. 3.

Referring to FIG. 5, in step 501, a client A 510-1 generates a session with a content provider 540 via a server A 520-1 and a gateway 530. In accordance to this, the client A 510-1 may be in a state of receiving content via the session. Also, it is assumed that a request for receiving an event (for example, new user's joining a group) for the previously generated session of the client A 510-1 has already been made.

In step 503, the client A 510-1 generates recommendation information to be relayed to a user of a client B 510-2. For example, the recommendation information may include at least one of a name of a program intended to be recommended, identification information capable of identifying the program, a program description, program start time information, program end time information, and a method of acquiring more detailed information about the program.

In step 505, the client A 510-1 transmits the recommendation information to the client B 510-2. For example, the recommendation information may be transmitted via a SIP message. The recommendation information is relayed to the client B 510-2 via the server A 520-1 and the server B 520-2.

In step 507, the client B 510-2 transmits a confirmation message on the recommendation information received from the client A 510-1. For example, the confirmation message may be a "200 OK" message. The confirmation message is relayed to the client A 510-1 via the server B 520-2 and the server A 520-1.

In step 509, the client B 510-2 confirms that a user of the client B 510-2 has requested to view recommended content. That is, the user instructs to view the content recommended by the recommendation information, and the client B 510-2 confirms the user's instruction. The instruction may be recognized via an input means of the client B 510-2.

In step 511, the client B 510-2 transmits a join request for joining the session generated by the client A 510-1. For example, the join request may be transmitted via a SIP INVITE message. The join request is relayed to the server A

520-1 controlling the session, via the server B 520-2. For example, in accordance to a dial-in procedure, the client B 510-2 may include in the join request a group address (for example, sip:OMA-ISC-programX_group123@providerY.net) included in the SIP message received in step 505. For example, the group address may be included in a request-URI header of the SIP INVITE message.

In step 513, the server A 520-1 transmits a message of accepting the received join request. For example, the accepting message may be a "200 OK" message. The accepting message is relayed to the client B 510-2 via the server B 520-2.

In step 515, the server A 520-1 transmits to the client A 510-1 a notification that the client B 510-2 joins the session. The notification may be transmitted via a SIP NOTIFY message.

In step 517, the client A 510-1 transmits to the server A 520-1 a confirmation message confirming that it has received the notification from the server A 520-1. The confirmation message may be a "200 OK" message.

In step 519, the client A 510-1 and the client B 510-2 concurrently view multimedia content via the session generated by the client A 510-1. Also, the client A 510-1 and the client B 510-2 may mutually communicate.

Figure 6:
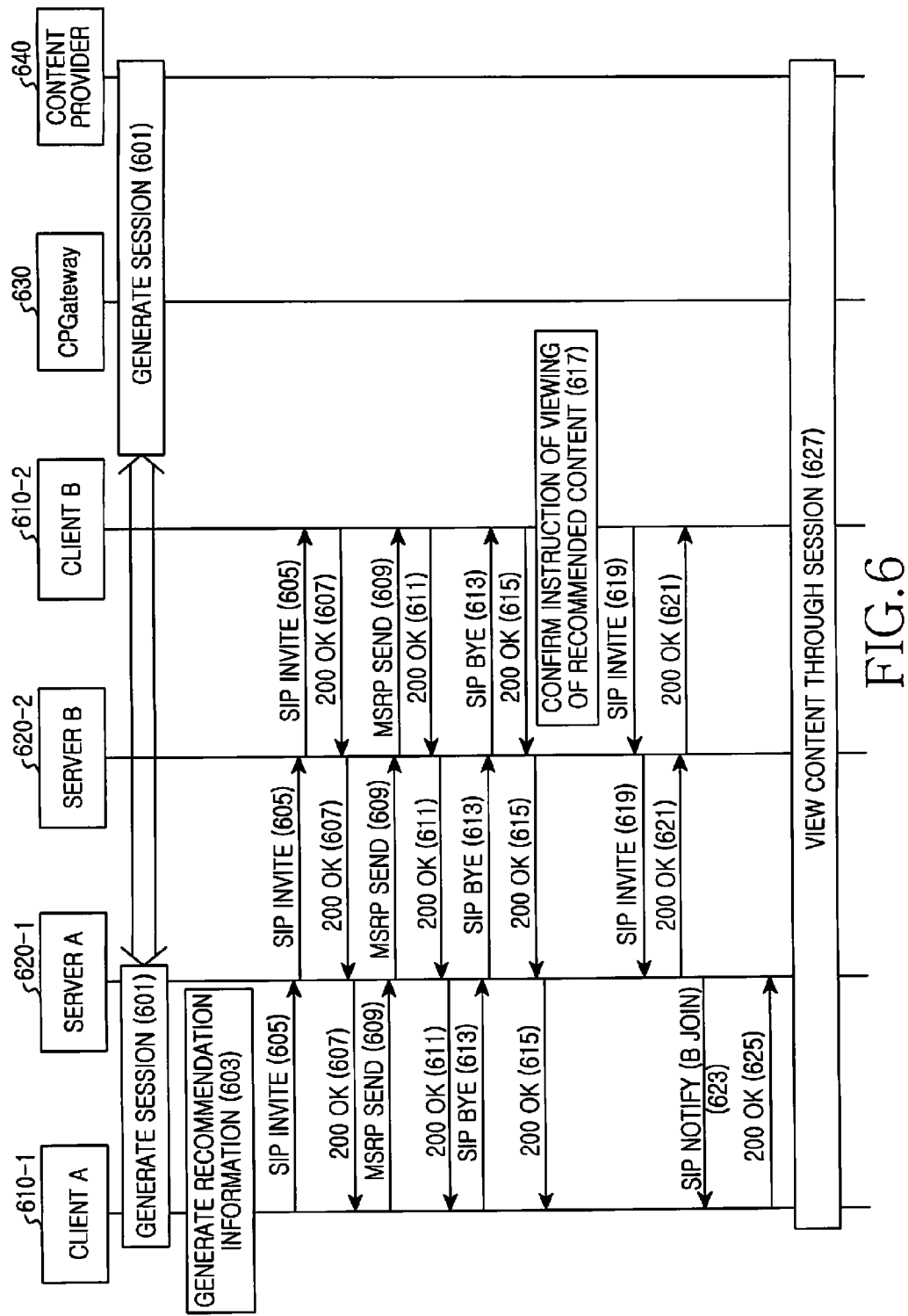
FIG. 6 is a ladder diagram illustrating a signal exchange for viewing of recommended multimedia content in a communication system according to an embodiment of the present invention.

FIG. 6 is a ladder diagram illustrating a signal exchange for viewing of recommended multimedia content in a communication system according to an embodiment of the present invention. FIG. 6 illustrates an embodiment of the present invention corresponding to a case where recommendation information is relayed in accordance to an embodiment of the present invention illustrated in FIG. 4.

Referring to FIG. 6, in step 601, a client A 610-1 generates a session with a content provider 640 via a server A 620-1 and a gateway 630. In accordance with this, the client A 610-1 may be in a state of receiving content via the session. Also, it is assumed that a request for receiving an event (for example, new user's joining a group) for the previously generated session of the client A 610-1 has already been made.

In step 603, the client A 610-1 generates recommendation information to be relayed to a user of a client B 610-2. For example, the recommendation information may include at least one of a name of a program intended to be recommended, identification information capable of identifying the program, a program description, program start time information, program end time information, and a method of acquiring more detailed information about the program.

In step 605, the client A 610-1 transmits a session setting request for sending the recommendation information to the client B 610-2. For example, the session setting request may be transmitted via a SIP INVITE message. The request is relayed to the client B 610-2 via the server A 620-1 and the server B 620-2.

In step 607, the client B 610-2 transmits a message of accepting the session setting request received from the client A 610-1. For example, the accepting message may be a "200 OK" message. The accepting message is relayed to the client A 610-1 via the server B 620-2 and the server A 620-1.

In step 609, the client A 610-1 transmits a relay message including the recommendation information generated in step 603. For example, the relay message may be an MSRP SEND message, and may be transmitted in a file transfer method. The relay message is relayed to the client B 610-2 via the server A 620-1 and the server B 620-2.

In step 611, the client B 610-2 transmits a confirmation message on the recommendation information received from the client A 610-1. For example, the confirmation message may be a "200 OK" message. The confirmation message is relayed to the client A 610-1 via the server B 620-2 and the server A 620-1.

In step 613, the client A 610-1, having transmitted the recommendation information, transmits a session end request. For example, the session end request may be transmitted via a SIP BYE message. The session end request is relayed to the client B 610-2 via the server A 620-1 and the server B 620-2.

In step 615, the client B 610-2 transmits a message of accepting the session end request received from the client A 610-1. For example, the accepting message may be a "200 OK" message. The accepting message is relayed to the client A 610-1 via the server B 620-2 and the server A 620-1.

In step 617, the client B 610-2 confirms that a user of the client B 610-2 has requested to view recommended content. That is, the user instructs to view the content recommended by the recommendation information, and the client B 610-2 confirms the user's instruction. The instruction may be recognized via an input means of the client B 610-2.

In step 619, the client B 610-2 transmits a join request for joining the session generated by the client A 610-1. For example, the join request may be transmitted via a SIP INVITE message. The join request is relayed to the server A 620-1 controlling the session, via the server B 620-2. For example, in accordance to a dial-in procedure, the client B 610-2 may include in the join request a group address (for example, sip:OMA-ISC-programX_group123@providerY.net) included in the SIP INVITE message received in step 605. For example, the group address may be included in a request-URI header of the SIP INVITE message.

In step 621, the server A 620-1 transmits a message of accepting the received join request. For example, the accepting message may be a "200 OK" message. The accepting message is relayed to the client B 610-2 via the server B 620-2.

In step 623, the server A 620-1 transmits to the client A 610-1 a notification of notifying the client A 610-1 that the client B 610-2 joins the session. The notification may be transmitted via a SIP NOTIFY message.

In step 625, the client A 610-1 transmits to the server A 620-1 a confirmation message confirming that it has received the notification from the server A 620-1. The confirmation message may be a "200 OK" message.

In step 627, the client A 610-1 and the client B 610-2 concurrently view multimedia content via the session generated by the client A 610-1. Also, the client A 610-1 and the client B 610-2 may mutually communicate.

In FIG. 6, the SIP INVITE message transmitted in step 605 does not include the recommendation information. That is, if the session setting request is accepted via the "200 OK" message in step 607, the recommendation information is transmitted in step 609. In accordance to this, in the future, if the client B 610-2 decides viewing in accordance to the recommendation information, the SIP INVITE message is separately transmitted as in step 619.

In accordance to an embodiment of the present invention, the client A having previously set a session for content reception does not transmit a separate SIP INVITE message for sending only recommendation information, and may transmit the recommendation information together via a process of inviting the client B to the previously set session. In this case, if receiving the SIP INVITE message, the client B may promptly notify a user of the recommendation information. If the user instructs to view in accordance to the recommendation information, the client B transmits the accepting message (for example: "200 OK"), thereby being able to join the session generated by the client A. A detailed description is made as in FIG. 7 below.

Figure 7:
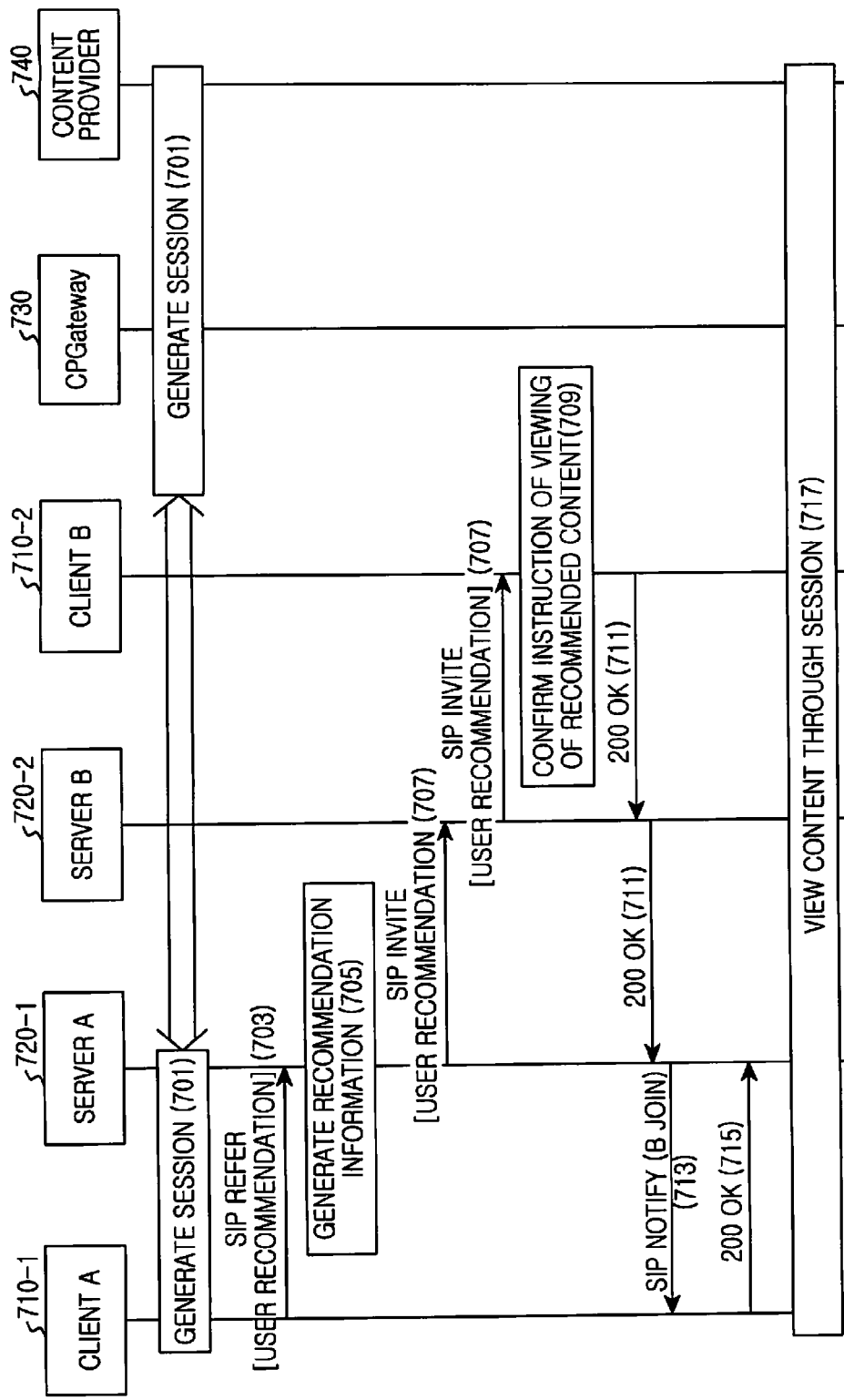
FIG. 7 is a ladder diagram illustrating a signal exchange for viewing of recommended multimedia content in a communication system according to an embodiment of the present invention.

FIG. 7 is a ladder diagram illustrating a signal exchange for viewing of recommended multimedia content in a communication system according to an embodiment of the present invention.

Referring to FIG. 7, in step 701, a client A 710-1 generates a session with a content provider 740 via a server A 720-1 and a gateway 730. In accordance to this, the client A 710-1 may be in a state of receiving content via the session. Also, it is assumed that a request for receiving an event (for example, new user's joining a group) for the previously generated session of the client A 710-1 has already been made.

In step 703, the client A 710-1 transmits a join request message to the server A 720-1 so as to invite a client B 710-2 to the session (i.e., a referral, or REFER, message). For example, the join request message may be a SIP REFER message. Here, the SIP REFER may include information such as in Table 5 below.

TABLE 5

REFER <ISC_content_viewing_session_identity> SIP/2.0
Via: SIP/2.0/UDP clientA@domainA.com;branch=z9hG4bK2293940223
To: <sip:serverA@domainA.com>;
From: <sip:userA@domainA.com>;tag=193402342
Call-ID: 898234234@agentA.domainA.com
CSeq: 93809823 REFER
Max-Forwards: 70
Refer-To: <sip:userB@domainB.com;method=INVITE>
Contact: sip:clientA@domainA.com
Content-Type: multipart/related; type="application/sdp";
boundary="boundary71"
Content-Length: [length of recommendation info data]
Content-Disposition: attachment
--boundary71—
Content-Type: application/vnd.oma.isc.recommendinfo
Content-Length: [length of program info]
<program_info>
   <user_message> ...</user_message>
</program_info>
--boundary71—

Referring to Table 5 above, an address included in the SIP REFER message may be an address identifying the session generated by the client A 710-1. For example, the address may include the same SIP URI as "sip:OMA-ISC-programX_group123@providerY.net." The server A 720-1 having received the address can recognize that the SIP REFER message is a request for inviting the client B 710-2 to an existing previously-generated session, not a request for generating a new session.

Also, a lower content-type of the SIP REFER message may be set as a value newly defined for recommendation information. For example, the newly defined value may be "application/vnd.oma.isc.recommendinfo." In accordance to this, the SIP REFER message further indicates that it includes recommendation information of a user of the client A 710-1 as well as a request for transmitting a SIP INVITE to the client B 710-2.

Also, the SIP REFER message may further include recommended content and a related personal message (for example, a description about a reason for recommending content), which are composed by the user of the client A 710-1.

In step 705, the server A 720-1, having received the SIP REFER message, generates recommendation information. In detail, the server A 720-1 collects information related to contents provided via the session, via the "application/vnd.oma.isc.recommendinfo" included in the SIP REFER message. For example, the information related to the contents includes at least one of the items shown in Table 1 above. In accordance to an embodiment of the present invention, in step 703, the client A 710-1 may provide the server A 720-1 with the information related to the content.

In step 707, the server A 720-1 transmits an invite message to the client B 710-2 via a server B 720-2 in order to invite the client B 710-2 to the previously generated session. The invite message includes information notifying recommendation of the user of the client A 710-1. For example, the invite message may be a SIP INVITE message. Here, the SIP INVITE message may include information such as in Table 6 below.

TABLE 6

INVITE sip:userB@domainB.com SIP/2.0
To: <sip:userB@domainB.com>
From: <sip:userA@domainA.com>;tag=193402342
Contact: sip:userA@clientA.domainA.com
(...)
Content-Type: multipart/related; type="application/sdp";
   boundary="boundary71"
Content-Length: [length]
--boundary71
Content-Type: application/sdp
Content-Length: [length of SDP]
[SDP content]
--boundary71--
Content-Type: application/vnd.oma.isc.recommendinfo
Content-Length: [length of recommendation/program info]
<program_info>
   <name> ... </name>
   <id> ... </id>
   <description> ... </description>
   <start_time> ... </start_time>
   <end_time> ... </end_time>
   <info_url> ... </info_url>
   <user_message> ... </user_message>
   <expiry_time> ... </expiry_time>
</program_info>
--boundary71--

Referring to Table 6 above, a content-type of a lower level may be set as a value newly defined for recommendation information. The newly defined value may be "application/vnd.oma.isc.recommendinfo", and the SIP INVITE message indicates not only inviting the client B 710-2 to the session, but also includes recommendation information of a user. Further, the content of the content-type "application/vnd.oma.isc.recommendinfo" may include at least one of the items shown in Table 1 above.

In step 709, the client B 710-2 confirms that a user of the client B 710-2 has requested to view recommended content. That is, the user of the client B 710-2 instructs to view the content recommended by the recommendation information, and the client B 710-2 confirms the user's instruction. The instruction can be recognized via an input means of the client B 710-2.

In step 711, as confirming the user's instruction, the client B 710-2, having received the session invitation, transmits a confirmation message confirming that it joins the session. For example, the confirmation message may be a "200 OK" message.

In step 713, the server A 720-1 transmits to the client A 710-1 a notification that the client B 710-2 joins the session. The notification may be transmitted via a SIP NOTIFY message.

In step 715, the client A 710-1 transmits to the server A 720-1 a confirmation message confirming that it has received the notification from the server A 720-1. The confirmation message may be a "200 OK" message.

In step 717, the client A 710-1 and the client B 710-2 concurrently view multimedia content via the session generated by the client A 710-1. Also, the client A 710-1 and the client B 710-2 may mutually communicate.

Figure 8:
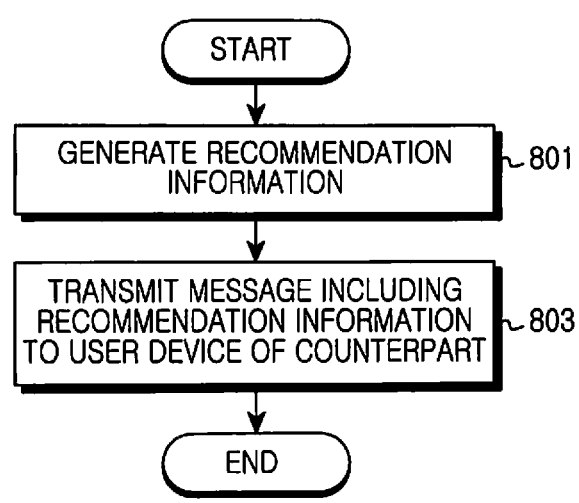
FIG. 8 is a flowchart of a method of a user device recommending content in a communication system according to an embodiment of the present invention.

FIG. 8 is a flowchart of a method of a user device recommending content in a communication system according to an embodiment of the present invention.

Referring to FIG. 8, in step 801, the user device generates recommendation information. The recommendation information includes information necessary for another user to join a session carrying recommended content. For example, the recommendation information may include at least one of a type value indicating the inclusion of recommendation information, a name of a program intended to be recommended, identification information capable of identifying the program, a program description, program start time information, program end time information, information for acquiring more detailed information about the program, an available period, a preview image, a message of a recommender, and information for accessing a group. The recommendation information may be generated by generation of a user's recommendation instruction for content. The recommendation instruction may be generated during the consumption of the content. The consumption may include listening if the content is an audio and viewing if the content is a video. The recommendation instruction can be recognized via an input means of the user device. For example, the input means may be one of a key and a touch screen.

Next, the user device proceeds to step 803 and transmits a message including the recommendation information, in other words, a message for content recommendation, to a user device of a counterpart who will get a recommendation. The message may be relayed to the user device of the counterpart via a server controlling a session of the user device and a server controlling a session of the counterpart's user device. The message may be one of a SIP message, an MSRP SEND message, and a SIP REFER message. For example, the message may be constructed as in Table 1, Table 2, Table 4, and Table 5 above.

Though not illustrated in FIG. 8, prior to transmitting the message including the recommendation information, the user device may generate a session for transmitting the recommendation information. Accordingly, the user device transmits a session setting request. For example, the session setting request may be transmitted via a SIP INVITE message. In this case, the session setting request includes information indicating that the recommendation information is to be transmitted via the session. For example, the information indicating that the recommendation information is to be transmitted via the session may be a MIME type defined for the recommendation information. Further, the session setting request may further include an address of a recommender, an address of a recommendee, and information about file transfer.

Figure 9:
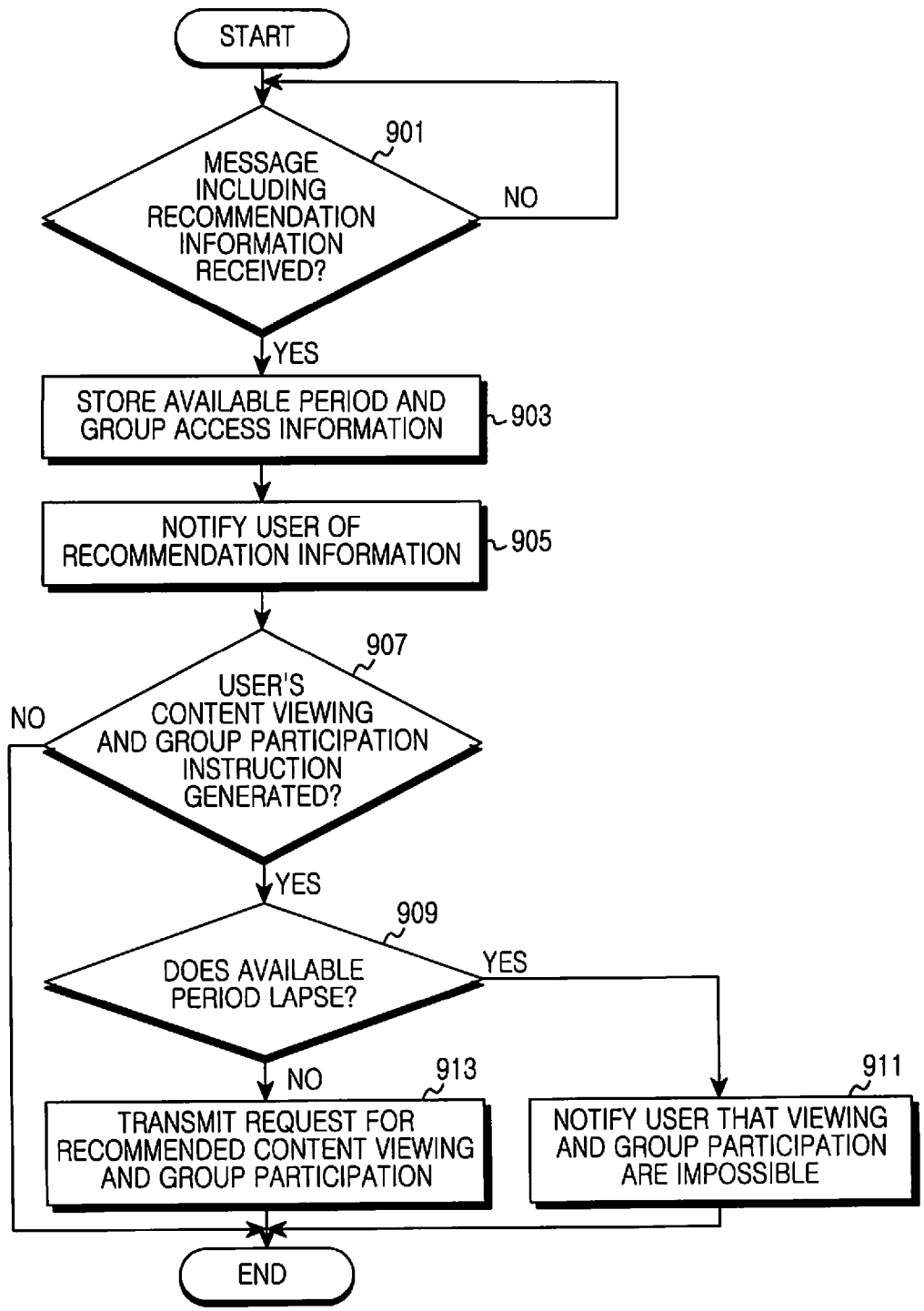
FIG. 9 is a flowchart of a method of a user device getting a recommendation for content in a communication system according to an embodiment of the present invention.

FIG. 9 is a flowchart of a method of a user device getting a recommendation for content in a communication system according to an embodiment of the present invention.

Referring to FIG. 9, in step 901, the user device determines if a message including recommendation information is received. The recommendation information includes information about multimedia content intended to be recommended to a user of the user device. The message including the recommendation information may be one of a SIP message, an MSRP SEND message, and a SIP INVITE message. Whether the message includes the recommendation information can be determined via a content-type header value of the message. That is, the user device can determine whether the message includes the recommendation information via whether the header value of the message is a value defined for the recommendation information. For example, the value defined for the recommendation information may be "application/vnd.oma.isc.recommend-info."

If the message including the recommendation information is received, the user device proceeds to step 903 and stores available period information and group access information which are included in the recommendation information. The recommendation information may include other information. For example, the recommendation information may include at least one of a type value indicating inclusion of the recommendation information, a name of a program intended to be recommended, identification information capable of identifying the program, a program description, program start time information, program end time information, information for acquiring more detailed information about the program, an available period, a preview image, a message of a recommender, and information for accessing a group. For example, the recommendation information may be constructed as in Table 1, Table 2, Table 4, and Table 6. In this case, the available period may be a value set to <expiry_time> of <program_info>, and the group access information may be a value set to <address> of <group_info>.

Then, the user device proceeds to step 905 and notifies the user of the user device of the recommendation information. For example, the user device may display via a display means a User Interface (UI) notifying the reception of a recommendation of at least one item, content included in the recommendation information. The UI may include a character and a graphic. Furthermore, the user device may display a UI for confirming a user's selection for recommended content viewing and group joining. Also, the user device may display a UI instructing to display additional information about a recommended program.

Next, the user device proceeds to step 907 and determines if an instruction for user's content viewing and group joining is generated. That is, the user device determines if the user selects the content viewing and group joining via the UI for confirming the user's selection. If the instruction for the content viewing and group joining is not generated, the user device terminates the present procedure.

In contrast, if the instruction for the content viewing and group joining is generated, the user device proceeds to step 909 and determines if an available period for the recommendation information has lapsed. The available period is determined by the available period information stored in step 903. In other words, the user device determines if the recommendation information is still effective.

If the available period has lapsed, the user device proceeds to step 911 and notifies the user that the content viewing and group joining are impossible. For example, the user device may display a UI notifying that the content viewing and group joining are impossible via the display means. The UI may include a character and a graphic.

In contrast, if the available period has not lapsed, the user device proceeds to step 913 and transmits a request for recommended content viewing and group joining. For example, the user device transmits the request to a server controlling a session of a user device having transmitted the recommendation information. For example, the request may be transmitted via a SIP INVITE message. In accordance to an embodiment of the present invention, the request may be transmitted via a "200 OK" message. The request includes the group access information stored in step 903. For example, the group access information may be included in a request-URI header.

Next, though not illustrated in FIG. 9, the user device may join a session of a user device having transmitted the recommendation information and, accordingly, provide the recommended content to a user, and participate in a group. For example, the joining may be performed by a dial-in procedure.

Figure 10:
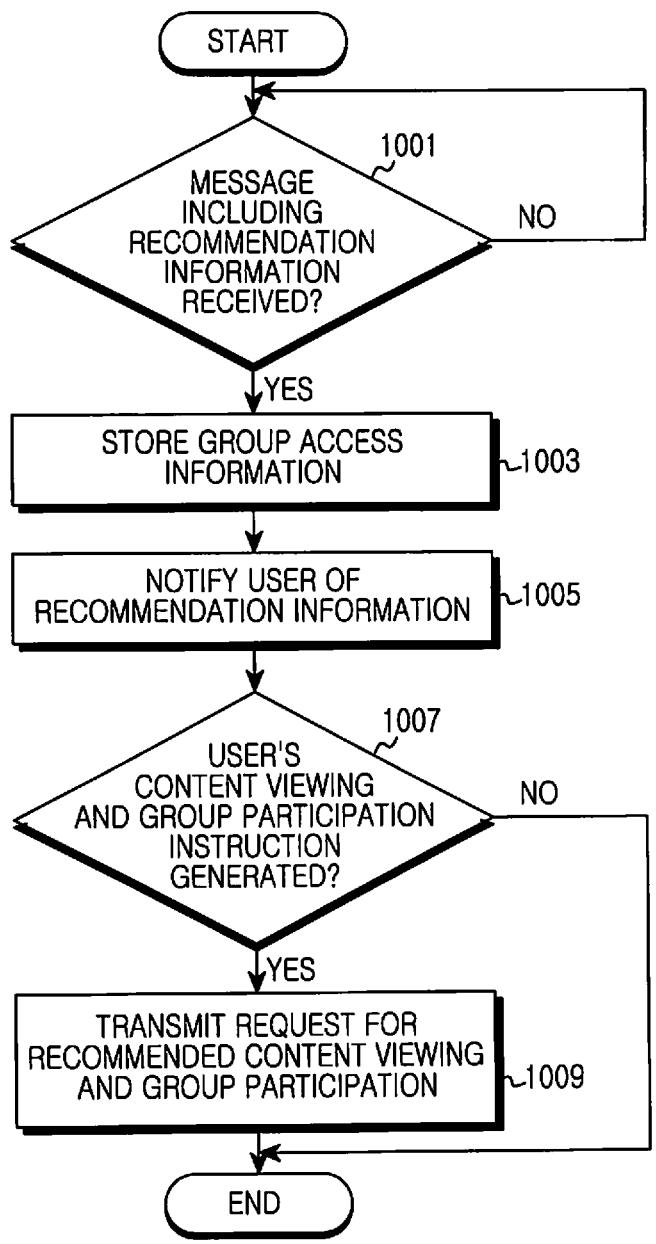
FIG. 10 is a flowchart of a method of a user device getting a recommendation for content in a communication system according to an embodiment of the present invention.

FIG. 10 is a flowchart illustrating a method of a user device getting a recommendation for content in a communication system according to an embodiment of the present invention.

Referring to FIG. 10, in step 1001, the user device determines if a message including recommendation information is received. The recommendation information includes information about multimedia content intended to be recommended to a user of the user device. The recommendation information may be received via one of a SIP message, an MSRP SEND message, and a SIP INVITE message. Whether the message includes the recommendation information may be determined via a content-type header value of the message. That is, the user device can determine whether the message includes the recommendation information via whether the header value of the message is a value defined for the recommendation information. For example, the value defined for the recommendation information may be "application/vnd.oma.isc.recommend-info."

If the message including the recommendation information is received, the user device proceeds to step 1003 and stores group access information which is included in the recommendation information. The recommendation information may include other information. For example, the recommendation information may include at least one of a type value indicating inclusion of the recommendation information, a name of a program intended to be recommended, identification information capable of identifying the program, a program description, program start time information, program end time information, information for acquiring more detailed information about the program, an available period, a preview image, a message of a recommender, and information for accessing a group. For example, the recommendation information may be constructed as in Table 1, Table 2, Table 4, and Table 6 above. In this case, the group access information may be a value set to <address> of <group_info>.

Then, the user device proceeds to step 1005 and notifies the user of the recommendation information. For example, the user device may display via a display means a UI notifying the reception of recommendation of at least one item, content included in the recommendation information. The UI may include a character and a graphic. Furthermore, the user device may display a UI for confirming a user's selection for recommended content viewing and group joining. Also, the user device may display a UI instructing to display additional information about a recommended program.

Next, the user device proceeds to step 1007 and determines if an instruction for user's content viewing and group joining is generated. That is, the user device determines if the user selects the content viewing and group joining via the UI for confirming the user's selection. If the instruction for the content viewing and group joining is not generated, the user device terminates the present procedure.

In contrast, if the instruction for the content viewing and group joining is generated, the user device proceeds to step 1009 and transmits a request for recommended content viewing and group joining. For example, the user device transmits the request to a server controlling a session of a user device having transmitted the recommendation information. For example, the request may be transmitted via a SIP INVITE message. In accordance to another exemplary embodiment of the present invention, the request may be transmitted via a "200 OK" message. The request includes the group access information stored in step 1003. For example, the group access information may be included in a request-URI header.

Next, though not illustrated in FIG. 10, the user device may join a session of a user device having transmitted the recommendation information and, accordingly, provide the recommended content to a user, and participate in a group. For example, the joining may be performed by a dial-in procedure.

Figure 11:
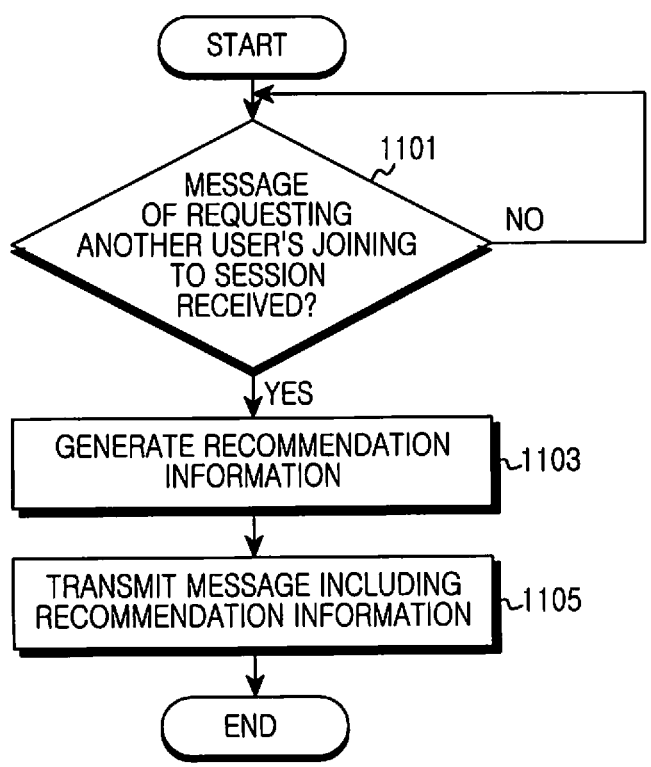
FIG. 11 is a flowchart of a method of a server in a communication system according to an embodiment of the present invention.

FIG. 11 is a flowchart illustrating a method of a server in a communication system according to an embodiment of the present invention.

Referring to FIG. 11, in step 1101, the server determines if a message requesting that another user join a session is received. Here, the session means a session controlled by the server, and the another user means a user other than a user who is provided content via the session. That is, the message is received from the user who is provided content via the session, and indicates that the user intends to recommend content to another user. For example, the message may be a SIP REFER message. The message may include information notifying that it is a request of inviting another user to a previously generated session, for example, an address identifying the session. Also, the message may include a content-type that is set as a value defined for recommendation information.

If the message requesting the joining is received, the server proceeds to step 1103 and generates recommendation information. The recommendation information includes information necessary for the another user to join the session carrying recommended content. For example, the recommendation information may include at least one of a type value indicating inclusion of the recommendation information, a name of a program intended to be recommended, identification information capable of identifying the program, a program description, program start time information, program end time information, information for acquiring more detailed information about the program, an available period, a preview image, a message of a recommender, and information for accessing a group. For the sake of this, the server may directly collect information about the content. In accordance to an embodiment of the present invention, the information about the content may be included in the message received in step 1101. In this case, the server may generate the recommendation information using the information acquired via the message.

After generating the recommendation information, the server proceeds to step 1105 and transmits a message including the recommended information. The message including the recommendation information may be relayed to a user device of the another user via a server controlling a session of the user device of the another user. For example, the message including the recommendation information may be a SIP INVITE message. Here, the SIP INVITE message may include the recommendation information and a content type that is set as a value defined for the recommendation information. For example, the message may be constructed as in Table 6 above.

Figure 12:
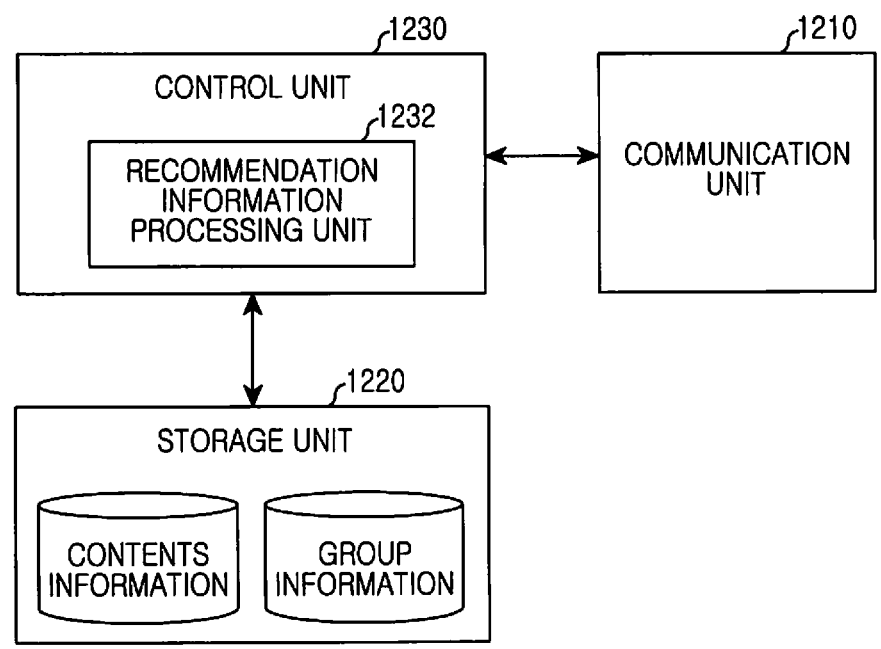
FIG. 12 is a block diagram of a user device in a communication system according to an embodiment of the present invention.

FIG. 12 is a block diagram illustrating a construction of a user device in a communication system according to an embodiment of the present invention.

Referring to FIG. 12, the user device includes a communication unit 1210, a storage unit 1220, and a control unit 1230.

The communication unit 1210 provides an interface for transmitting/receiving a signal. That is, the communication unit 1210 converts into a physical signal a bit stream transmitted to another node, for example, a server and the like in the user device, and converts into a bit stream a physical signal received from the another node. The communication unit 1210 may provide a wireless interface or a wired interface. In a case of providing the wireless interface, the communication unit 1210 may include a transmission filter, a reception filter, an amplifier, a mixer, an oscillator, a Digital to Analog Converter (DAC), an Analog to Digital Converter (ADC), an antenna, and the like.

The storage unit 1220 stores data such as a basic program for an operation of the user device, an application program, setting information, and the like. The storage unit 1220 stores information about contents, and group information related to content recommendation. The information about the contents may include information about content which is being consumed when the user device recommends content, and information included in the recommendation information when the user device receives a recommendation of content. The information about the group, information for accessing a group, may include a URI of the group. In addition, the storage unit 1220 provides the stored data in accordance to a request of the control unit 1230.

The control unit 1230 controls the general operations of the user device. For example, the control unit 1230 transmits/receives a signal via the communication unit 1210. Also, the control unit 1230 records data in the storage unit 1220 and reads the data. In accordance with an embodiment of the present invention, the control unit 1230 includes a recommendation information processing unit 1232 for generating and interpreting recommendation information. For example, the control unit 1230 controls the user device to perform the procedures illustrated in FIG. 3 to FIG. 10. An operation of the control unit 1230 according to an embodiment of the present invention is given as follows.

The user device may transmit recommendation information. In this case, in accordance to an embodiment of the present invention, the control unit 1230 generates a message including recommendation information about content, and transmits the message to a user device of a counterpart who will get a recommendation via the communication unit 1210. The recommendation information may be relayed to the user device of the counterpart via a server controlling a session of the user device and a server controlling a session of the user device of the counterpart. The recommendation information may be transmitted via one of a SIP message, an MSRP SEND message, and a SIP REFER message. For example, the recommendation information may include at least one of a type value indicating inclusion of the recommendation information, a name of a program intended to be recommended, identification information capable of identifying the program, a program description, program start time information, program end time information, information for acquiring more detailed information about the program, an available period, a preview image, a message of a recommender, and information for accessing a group. For example, the recommendation information may be constructed as in Table 1, Table 2, Table 4, and Table 5 above.

In accordance to an embodiment of the present invention, prior to transmitting the recommendation information, the control unit 1230 may generate a session for transmitting the recommendation information. Accordingly, the control unit 1230 may transmit a session setting request via the communication unit 1210. For example, the session setting request may be transmitted via a SIP INVITE message. In this case, the session setting request includes information indicating that the recommendation information is transmitted via the session. For example, the information indicating that the recommendation information is transmitted via the session may be a MIME type defined for the recommendation information. Furthermore, the session setting request may include an address of a recommender, an address of a recommendee, and information about file transfer.

The user device may receive recommendation information. In this case, in accordance to an embodiment of the present invention, the control unit 1230 receives a message including the recommendation information via the communication unit 1210. The recommendation information includes information about specific multimedia content intended to be recommended to a user of the user device. The recommendation information may be received via one of a SIP message, an MSRP SEND message, and a SIP INVITE message. For example, the control unit 1230 may determine whether the message includes the recommendation information based on whether the header value of the message is a value defined for the recommendation information. For example, the value defined for the recommendation information may be "application/vnd.oma.isc.recommendinfo."

If the recommendation information is received, the control unit 1230 notifies a user of the recommendation information. For example, the control unit 1230 displays via a display means at least one of a UI notifying the reception of recommendation of at least one item, content included in the recommendation information, a UI for confirming a user's selection for recommended content viewing and group joining, and a UI instructing to display additional information about a recommended program. After that, if an instruction for the content viewing and group joining is generated, the control unit 1230 transmits a request for the recommended content viewing and group joining. For example, the request may be transmitted via one of a SIP INVITE message and a "200 OK" message. After that, the control unit 1230 joins a session of a user device having transmitted the recommendation information and, accordingly, may provide the recommended content to a user, and participate in a group. For example, the joining may be performed by a dial-in procedure.

Then, the recommendation information may include available period information. If the available period has lapsed upon generation of the instruction for the content viewing and group joining, the control unit 1230 notifies the user that the content viewing and group joining are impossible, and does not transmit the request for the recommended content viewing and group joining.

The block diagram illustrated in FIG. 12 has been described as a block diagram of a user device. But, the block diagram illustrated in FIG. 12 may be applied to a server. That is, the server may include a communication unit, a storage unit, and a control unit. The control unit may control the server to perform the operations of the server illustrated in FIG. 5 to FIG. 7 and the procedure illustrated in FIG. 11.

By transmitting recommendation information in a communication system, it can recommend content that a user is viewing for another user. If a recommendee decides to view recommended content, the recommendee can participate in a viewing group including a recommender together as well as view the content, so a plurality of users can view the same content. Furthermore, even communication (for example, chatting) among users participating in the group is made possible and thus, and a richer User eXperience (UX) is provided.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

In the aforementioned exemplary embodiments of the present invention, constituent elements of the invention have been expressed in the singular number or the plural number in accordance to the proposed exemplary embodiments. However, the expression of the singular number or plural number is, for description convenience, selected suitable to a proposed situation. It is not that the present invention is limited to singular or plural constituent elements. Even the constituent element expressed in the plural number may be constructed in the singular number, or even the constituent element expressed in the singular number may be constructed in the plural number.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of a user device in a communication system, the method comprising:
generating a session initiation protocol (SIP) message for recommending a content to another user device; and
transmitting the SIP message to a server,
wherein the SIP message comprises a content type header field set to 'application/vnd.oma.isc.recommendinfo' and information on a group in which the recommended content is capable of being watched, and
wherein the information on the group comprises a name of the group, a description of the group, and an address of the group.

2. The method of claim 1, wherein the SIP message further comprises at least one of a name of the content intended to be recommended, an identifier of the content, a description for the content, start time information of the content, end time information of the content, an expiry time value of the content, a preview image of the content, and a message of a recommender.

3. The method of claim 1, further comprising generating a session for transmitting the information on the group.

4. The method of claim 3, wherein generating the session comprises transmitting a session setting request comprising information indicating transmission of the SIP message, via the session.

5. A method of a user device in a communication system, the method comprising:
receiving a session initiation protocol (SIP) message for recommending a content from another user device, via a server,
wherein the SIP message comprises a content type header field set to 'application/vnd.oma.isc.recommendinfo' and information on a group in which the recommended content is capable of being watched, and
wherein the information on the group comprises a name of the group, a description of the group, and an address of the group.

6. The method of claim 5, wherein the SIP message further comprises at least one of a name of the content intended to be recommended, an identifier of the content, a description for the content, start time information of the content, end time information of the content, expiry time value of the content, a preview image of the content, and a message of a recommender.

7. The method of claim 6, further comprising:
identifying whether the SIP message comprises the content type header field; and
upon identifying that the SIP message comprises the content type header field, storing the expiry time value of the content and the address of the group.

8. The method of claim 7, further comprising:
receiving, from the other user device, a message for requesting to participate in the group;
determining whether the expiry time value has expired, when the message for requesting to participate in the group is received.

9. The method of claim 8, further comprising:
upon determining that the expiry time value has expired when the message for requesting to participate in the group is received, transmitting, to the other user device, a message indicating that the expiry time value has expired.

10. The method of claim 8, further comprising:
upon determining that the expiry time value has not expired when the message for requesting to participate in the group is received, transmitting, to the other user device, a message for content viewing request using the address of the group.

11. A method of a server recommending content in a communication system, comprising:
receiving a session initiation protocol (SIP) message for recommending a content, which is recommended from a user device, to another user device; and
transmitting the SIP message to the other user device, wherein the SIP message comprises a content type header field set to 'application/vnd.oma.isc.recommendinfo' and information on a group in which the recommended content is capable of being watched, and wherein the information on the group comprises a name of the group, a description of the group, and an address of the group.

12. The method of claim 11, wherein the message further comprises at least one of a name of the content intended to be recommended, an identifier of the content, a description for the content, start time information of the content, end time information of the content, an expiry time value of the content, a preview image of the content, and a message of a recommender.

13. A user device in a communication system, comprising:
a transceiver; and
a controller operatively coupled to the transceiver,
wherein the controller is configured to:
generate a session initiation protocol (SIP) message for recommending a content to another user device; and
transmit the SIP message to a server,
wherein the SIP message comprises a content type header field set to 'application/vnd.oma.isc.recommendinfo' and information on a group in which the recommended content is capable of being watched, and
wherein the information on the group comprises a name of the group, a description of the group, and an address of the group.

14. The user device of claim 13, wherein the message further comprises at least one of a name of the content intended to be recommended, an identifier of the content, a description for the content, start time information of the content, end time information of the content, an expiry time value of the content, a preview image of the content.

15. The user device of claim 13, wherein the controller is further configured to generate a session for transmitting the information on the group.

16. The user device of claim 15, wherein the controller is configured to transmit a session setting request comprising information indicating transmission of the SIP message, via the session.

17. A user device in a communication system, comprising:
a transceiver; and
a controller operatively coupled to the transceiver,
wherein the controller is configured to:
receive a session initiation protocol (SIP) message for recommending a content from another user device, via a server,
wherein the SIP message comprises a content type header field set to 'application/vnd.oma.isc.recommendinfo' and information on a group in which the recommended content is capable of being watched, and
wherein the information on the group comprises a name of the group, a description of the group, and an address of the group.

18. The user device of claim 17, wherein the SIP message further comprises at least one of a name of the content intended to be recommended, an identifier of the content, a description for the content, start time information of the content, end time information of the content, an expiry time value of the content, a preview image of the content, and a message of a recommender.

19. The user device of claim 18, wherein the controller is further configured to:
identify whether the SIP message comprises the content type header field; and
upon identifying that the SIP message comprises the content type header field, store the expiry time value of the content and the address of the group.

20. The user device of claim 19, wherein the controller is further configured to:
control to receive, from the other user device, a message for requesting to participate in the group;
determine whether the expiry time value has expired when the message for requesting to participate in the group is received.

21. The user device of claim 20, wherein the controller is further configured to:
upon determining that the expiry time value has expired when the message for requesting to participate in the group is received, control to transmit, to the other user device, a message indicating that the expiry time value has expired.

22. The user device of claim 20, wherein the controller is further configured to, upon determining that the expiry time value has not expired when the message for requesting to participate in the group is received, control to transmit, to the other user device, a message for content viewing request using the address of the group.

23. A server device in a communication system, comprising:
a transceiver; and
a controller operatively coupled to the transceiver,
wherein the controller is configured to:
control to receive a session initiation protocol (SIP) message for recommending a content, which is recommended from a user device, to another user device; and
control to transmit the SIP message to the other user device,
wherein the SIP message comprises a content type header field set to 'application/vnd.oma.isc.recommendinfo' and information on a group in which the recommended content is capable of being watched, and
wherein the information on the group comprises a name of the group, a description of the group, and an address of the group.

24. The server device of claim 23, wherein the SIP message further comprises at least one of a name of the content intended to be recommended, an identifier of the content, a description for the content, start time information of the content, end time information of the content, an expiry time value of the content, a preview image of the content, and a message of a recommender.

* * * * *